US012561344B2

(12) United States Patent
Raghuramu et al.

(10) Patent No.: US 12,561,344 B2
(45) Date of Patent: Feb. 24, 2026

(54) CLASSIFICATION INCLUDING CORRELATION

(71) Applicant: FORESCOUT TECHNOLOGIES, INC., San Jose, CA (US)

(72) Inventors: Arun Raghuramu, Milpitas, CA (US); Aveek Kumar Das, Santa Clara, CA (US); Yang Zhang, Fremont, CA (US)

(73) Assignee: Forescout Technologies, Inc., San Jose, CA (US)

( * ) Notice: Subject to any disclaimer, the term of this patent is extended or adjusted under 35 U.S.C. 154(b) by 83 days.

(21) Appl. No.: 17/031,199

(22) Filed: Sep. 24, 2020

(65) Prior Publication Data

US 2022/0092087 A1 Mar. 24, 2022

(51) Int. Cl.
| | |
|---|---|
| *G06F 16/28* | (2019.01) |
| *G06F 16/958* | (2019.01) |
| *G06N 20/00* | (2019.01) |
| *H04L 9/40* | (2022.01) |

(52) U.S. Cl.
CPC .......... *G06F 16/285* (2019.01); *G06F 16/958* (2019.01); *G06N 20/00* (2019.01); *H04L 63/20* (2013.01)

(58) Field of Classification Search
CPC ...... G06F 16/285; G06F 16/958; G06N 20/00
See application file for complete search history.

(56) References Cited

U.S. PATENT DOCUMENTS

| | | | | |
|---|---|---|---|---|
| 10,963,687 | B1 * | 3/2021 | Williams | .............. G06V 30/414 |
| 2008/0220874 | A1 * | 9/2008 | Tatsumi | ............... G06Q 20/382 463/42 |

| | | | | |
|---|---|---|---|---|
| 2016/0219065 | A1 * | 7/2016 | Dasgupta | ............ H04L 63/1441 |
| 2018/0189467 | A1 * | 7/2018 | Rao | ......................... H04L 63/08 |
| 2018/0270229 | A1 | 9/2018 | Zhang et al. | |
| 2018/0365593 | A1 * | 12/2018 | Galitsky | ................ G06N 5/022 |
| 2019/0306731 | A1 * | 10/2019 | Raghuramu | .......... H04L 63/102 |
| 2020/0356592 | A1 * | 11/2020 | Yada | ...................... G06V 20/20 |

FOREIGN PATENT DOCUMENTS

| | | | | |
|---|---|---|---|---|
| CA | 3056064 | A1 * | 9/2018 | ............ G06F 21/44 |
| WO | 2020118376 | A1 | 6/2020 | |

OTHER PUBLICATIONS

International Search report and Written Opinion on the Patentability of Application No. PCT/US2021/049827 Mailed Dec. 21, 2021, 13 pages.
International Preliminary Report on Patentability, dated Mar. 28, 2023 for International Patent Application No. PCT/US2021/049827 with filing date of Sep. 10, 2021; 7 pages.

\* cited by examiner

*Primary Examiner* — Van H Oberly
*Assistant Examiner* — Brooks T Hale
(74) *Attorney, Agent, or Firm* — Womble Bond Dickinson (US) LLP

(57) ABSTRACT

Systems, methods, and related technologies for classification are described. Network traffic from a network may be accessed. One or more values associated with one or more properties associated with an entity may be determined. The one or more values may be determined from the network traffic. A first classification attribute is determined based on the one or more values associated with one or more properties associated with the entity. A second classification attribute is determined, by a processing device, based on the first classification attribute and the one or more values associated with one or more properties associated with the entity. The second classification attribute is stored.

14 Claims, 6 Drawing Sheets

100

400

500

Network Communication Interface
502

External System Interface
504

Traffic Monitor Component
506

Data Access Component
508

Property Determination Component
510

Display Component
514

Notification Component
516

Policy Component
518

Classification Component
520

Classification Analysis Component
522

CLASSIFICATION INCLUDING CORRELATION

TECHNICAL FIELD

Aspects and implementations of the present disclosure relate to network monitoring, and more specifically, classification of entities of a network.

BACKGROUND

As technology advances, the number and variety of devices that are connected to communications networks are rapidly increasing. Each device may have its own respective vulnerabilities which may leave the network open to compromise or other risks. Preventing the spreading of an infection of a device or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
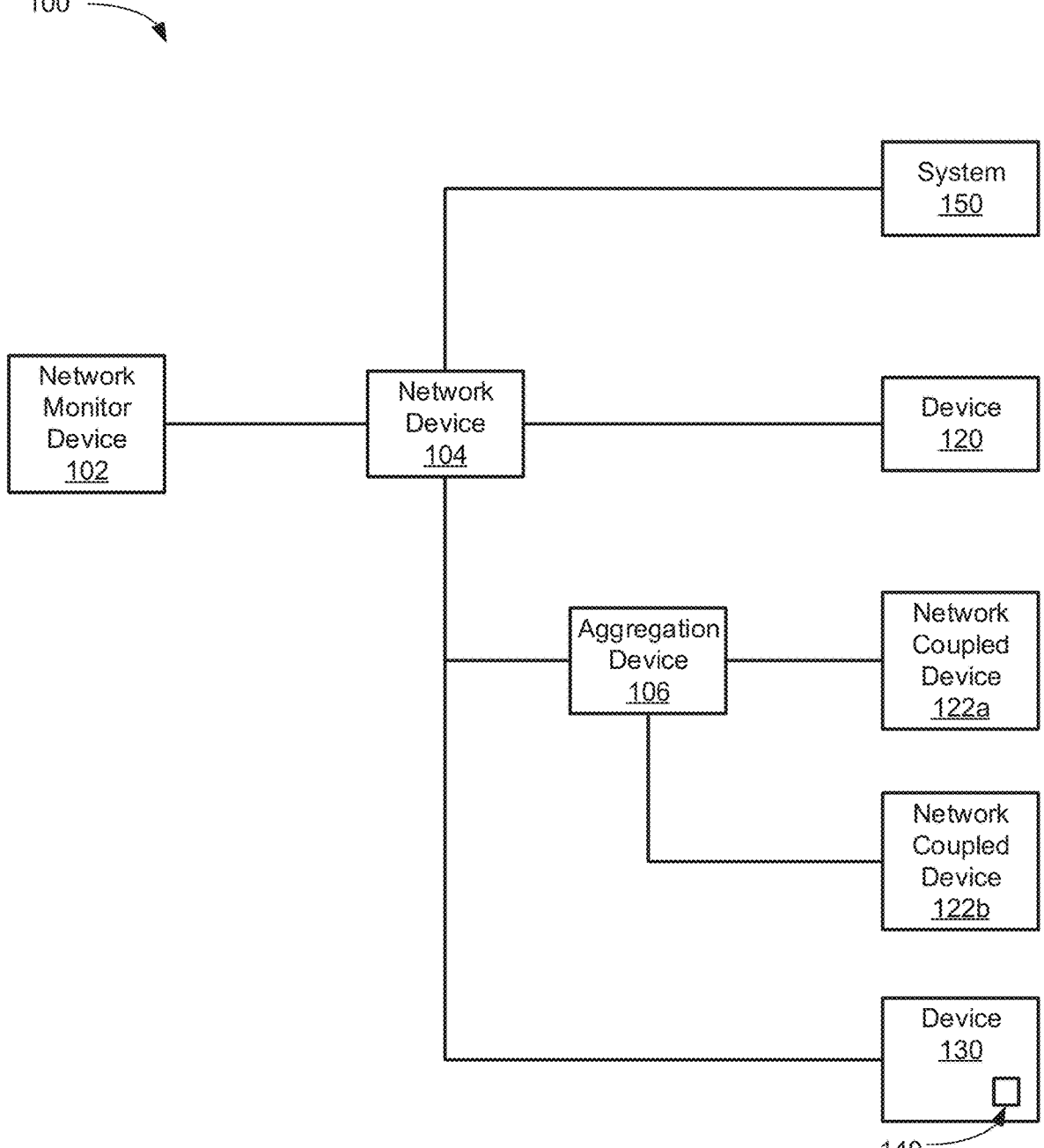
FIG. 1 depicts an illustrative communication network in accordance with one implementation of the present disclosure.

Aspects and implementations of the present disclosure are directed to using associations or correlations of data or information to perform classification of entities of a network (but may be applicable in other areas). The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras (IP cameras), wearable devices, medical devices, etc.) can make it difficult to effectively ensure that network security is maintained. Classification can be particularly important for securing a network because lack of knowledge about what a device is can prevent application of appropriate security measures. Accordingly, described herein in various implementations are systems, methods, techniques, and related technologies, which allow for improved classification of entities to enable securing of a network including performing one or more policies based on classification of an entity.

Accordingly, described herein in various implementations are systems, methods, techniques, and related technologies, which enable better classification by using correlations of data or information (e.g., one or more property values associated with an entity), classification attributes (e.g., vendor, function, operating system), or a combination thereof. Embodiments improve overall classification of an entity through classification based on one or more property values or one or more classification attributes (e.g., portions of a classification result). Embodiments may further solve the problem of insufficient classification (e.g., insufficient granularity) by improving classification results by using correlations (e.g., of classification attributes or results and one or more property values).

Current classification rules use property value or raw property values associated with each entity (e.g., endpoint) in a one step evaluation process. For example, a logical combination of network interface card (NIC) vendor, dynamic host configuration protocol (DHCP) values, NMAP values, etc., that lead to a classification output. The output of such classification rules may result in a classification result including one or more classification attributes. The classification attributes may be determined based on profiles, fingerprints, rules, machine learning, etc. The classification attributes may be function, operating system, or vendor (or vendor-model), etc. The function classification attribute may be associated with the function of an entity and may be printer, computer, server, desktop, laptop, smartphone, mobile device, tablet, networking, router, switch, IoT, OT, SCADA, PLC, thermostat, camera, IP camera, surveillance, entertainment, streaming, safety, X ray machine, patient monitor, etc. The vendor classification may be associated with the manufacturer or company of the entity and may include Microsoft™, Apple™, Samsung™ Google™, Rockwell™, Dell™, Sony™, APC™, Sonos™, Siemens™, LG™, Lenovo™, IBM™, Nest™, Belden™, Tripwire™, GE™, Baxter Laboratories™, Logitech™, Juniper Networks™, Cisco™, Meraki™, 3com™, Blackberry™, Nokia™, etc. The vendor classification attribute may further include model information, version information, etc. The operating system classification attribute may be associated with the operating system of an entity and may be Windows™, Linux™, MacOS™, Android™, iOS™, watchOS™, tvOS™, iPadOS™, embedded, proprietary, FreeBSD™, NetBSD™, Ubuntu™, Redhat Linux Enterprise™, Solaris™, OpenWRT™, Symbian™, PalmOS™, etc. The operating system classification attribute may further include an operating system version, patch level, service pack level, etc. Embodiments may support other classification attributes and the classification attributes may have value beyond those listed.

The classification attributes of the classification result or the output of the classification (e.g., first classification) may be one or two of function, operating system, or vendor. Thus, classification may be incomplete (e.g., with respect to one or more classification attributes) leading to a less than optimal or desirable user experience.

Embodiments are able to use the combination of one or more classification attributes (e.g., function, operating system, or vendor) with one or more property values (e.g., raw property values, for instance, open ports, Nmap data, user agent, etc.) to generate previously unknown classification values or attributes. It is appreciated that embodiments may support additional classification attributes beyond function, operating system, vendor, etc. For example, information or classification attributes of a device being a smartphone with the NIC vendor being Apple™ can be used to determine or infer that the operating system is iOS™. Embodiments can thus overcome the situation that the function classification attribute was not available when the evaluation of the operating system was performed (e.g., during a first classification).

In some embodiments, the strength of the correlation may have an associated confidence which may be associated with a classification based on a correlation. For example, for a classification of an entity with an operating system of iOS™, based on the entity having classification attributes of vendor being Apple™ and the function classification attribute being smartphone, the associated confidence value may be 100% or close to 100% since an entity or device that is a smartphone made by Apple™ has iOS™ preinstalled on the device.

Embodiments are further able to determine classifications based on classification attributes including vendor, function, and OS for Internet of Things (IoT), industrial control system (ICS), etc. In some embodiments, strong correlations that have been determined (e.g., predetermined, a-priori, etc.) between vendor, function, and OS associated with IoT or ICS devices as opposed to general purpose systems may be used for classification. For example, a networking device, for instance, a router, does not run the Windows™ operating system. As another example, an X-ray machine does not run Apple's™ MacOS™ operating system and will likely run the Windows™ or Linux™ operating system. These correlations can be used, by embodiments, to enhance classification coverage. As yet another example, an entity that is classified as a smartphone with a vendor of Samsung™ will not run the iOS™ operating system but will have a strong correlation with the Android™ operating system.

The correlations used by embodiments may be based on a degree of likelihood or confidence (e.g., based on a probability). For example, if a vendor of an entity is GE Healthcare™ the entity may be classified as having a high probability of being classified as having the Windows™ operating system.

Embodiment can include a multi-tiered system which uses one or more correlations between one or more classification attributes, one or more property values, or a combination thereof, to further improve classification coverage. Embodiments may be implemented in a variety of manners including, but not limited to, a multi-tier rule based classification system (e.g., a multi-tier rule based classification engine), a multi-tier machine learning based classification system (e.g., a multi-tier ML based classification engine), or a combination thereof.

In some embodiments, the multi-tier rule based system may access property values (e.g., from network traffic, as described herein, for instance open ports, vendor name (based on MAC address or DHCP values), Nmap data, etc.), access one or more rules, profiles, fingerprints, models, determine one or more classifications or classification attributes (e.g., function, operating system, vendor, etc.). One or more correlation or meta rules may be accessed and used to determine one or more additional classification results based one or more property values and the one or more classification attributes (e.g., previously determined based on rules, profiles, fingerprints, models, etc.). A correlation rule or meta rule may take one or more classification attributes, classification results, or outputs as input, which are then used with one or more property values (e.g., raw property values) to determine a classification (e.g., a second or additional classification). A meta-rule may thus classify (e.g., further classify, classify in a new way, or classify with further granularity) an entity based on a classification and one or more property values. In some embodiments, a meta-rule may be similar to a function that takes one or more classification results or attributes and one or more properties associated with an entity and returns or outputs a classification (e.g., a new classification) associated with the entity.

For example, if a classification attribute function of an entity is smartphone and a vendor property value or vendor classification attribute is Apple™, then the meta-rule may output a classification of the operating system as iOS™. As yet another example, an entity that is classified as a smartphone with a vendor of Samsung™ may be classified as having the Android™ operating system using a meta-rule. As an additional example, if an OS classification attribute of an entity is Cisco™ IOS and the vendor is Cisco™ (e.g., a classification attribute or a property value), then a meta-rule may classify the function as networking.

As another example, if the function associated with an entity is smartphone and the operating system is Windows™ then the entity may be classified as a Windows™ phone. As another example, if an entity has a function of IP camera and the vendor is Axis™ or the user agent includes axis camera, then the operating system may be classified as Linux. As another example, if an entity is classified as having a function of PLC and the vendor is Rockwell, the operating system may be classified as Linux or embedded OS (e.g., depending on one or more properties). The confidence associated with this OS classification may be low (e.g., near 50%) since Rockwell PLCs may have either a Linux or embedded OS.

In some embodiments, a multi-tier machine learning (ML) based classification system may access property values (e.g., from network traffic, as described herein, for instance open ports, vendor name (based on MAC address or DHCP values), Nmap data, etc.), access one or more rules, profiles, fingerprints, models, determine (a first set of) one or more classifications (e.g., function, operating system, vendor, etc.). One or more correlation or meta models (e.g., trained using machine learning) may be accessed and used to determine one or more classification results (e.g., including additional classification attributes) based on one or more property values and the one or more classifications. A correlation model or meta model may be trained using machine learning (e.g., supervised learning) based on one or more classification attributes or classification outputs, one or more property values (e.g., raw property values), and an associated classification label (e.g., an additional classification). The meta model may thus be trained on the correlation between one or more classification attributes and one or more property values. A meta model may thus classify (e.g., further classify, classify in a new way, or classify with further granularity) an entity based on one or more classifications and one or more property values. The meta model may be trained using supervised learning (e.g., with labeled data) on the correlations (e.g., of function, operating system, or vendor, and one or more property values) as described herein. The correlations used to train the machine learning model may be substantially similar to the meta-rules described herein. The meta model may be trained (e.g., using machine learning) based on a variety of sources of data, e.g., cloud based data, local data, web or Internet based data. In some embodiments, a meta model may be similar to a function that takes one or more classification attributes and one or more properties associated with an entity and returns or outputs a classification (e.g., a new classification) associated with the entity.

The meta rules and meta ML models mentioned herein may be referred to as meta classification resources that are configured to improve classification, as described herein. The meta rules and meta ML models described herein may use any classification attributes and property or property values to determine a classification, as described herein. The meta rules and meta ML models may utilize additional classification attributes and property or property values beyond those described herein to determine a classification.

In some embodiments, the meta ML model may use (e.g., take as input) one or more classification attributes (e.g., based on classification of an entity based on profiles, rules, fingerprints, ML model, etc.) as features or feature vector. Featurization is the process of encoding information into numerical form for use with one or more models or one or more rules. For example, the featurization may include converting one or more values associated with a property (of an entity) into a numerical form, e.g., a vector or a matrix, that can be processed by a machine learning trained model or used for training a model. The information in numerical form can then be used to train a machine learning model to be able to infer or determine a classification. In various embodiments, a feature may be a set of distinguishing characteristics for each class of an entity. For example, a feature may be a set of particular properties associated with a particular class of entities.

In some embodiments, the properties and associated data (e.g., property values, keyword counts, keywords matched, etc.) may be featurized using n-grams (e.g., representing multiple words or sequences of letters), for instance, 2-grams, 4-grams, etc., or term frequency—inverse document frequency (tf-idf) scores.

In various embodiments, each position in the feature vector may be associated with a property with a value associated with a particular property value in that position. For example, a vector may be <1, 4> where the first position is associated with NIC vendor and the second position is associated with DHCP information associated with an operating system. The value of one (1) in the vector may be associated with the vendor being Apple™ and the value of four (4) in the vector may be associated with the DHCP information of MacOS™. Embodiments may support vectors or other data structures having more positions and properties with those positions.

Each position in the vector may be associated with a raw property or property value or a derivative property. A derivative property is a numerical measure calculated based on characteristics of raw property values in data (e.g., from a local network, cloud data from one or more networks, data from other networks, etc.). For example, Hewlett-Packard (HP)™ makes computers, printers and scanners. The probability of the function of a device being a printer given that the vendor is HP may be 50%. This probability may be 'derived' from the frequency of co-occurrence in the data (e.g., associated with a network, an organization, or multiple networks), hence it is a derivative property. As another example, a derivative property may be a precalculated hash table of a probability vector of a classification output variable.

The classification attributes may be featurized in a variety of ways including one hot encoding of one or more classification attributes. For example, for a vector representing vendor may be represented with each position as a different vendor for a smartphone could be <1, 0, 0, 0> where the positions in the vector represent Microsoft™, Apple™, Google™, Samsung™, and LG™. The first position having a value of 1 in the vector represents that the vendor is Microsoft™.

The features or feature vector may thus be a list of properties in numerical form (e.g., a set of numbers). The meta ML model may further use (e.g., take as input) other features, as numerical forms, of properties associated with an entity to produce a featurized classification result. For example, the classification result of the meta ML model may be output as a precalculated hash table of a probability vector of an enhanced classification output variable. The precalculated hash table may be a probability of a vendor being associated with a particular function. For example, if a vendor of an entity is HP and the operating system is Windows, the output could be a probability that the entity was a computer (e.g., based on how many times in the sample set the function was a computer). As another example, if a vendor of an entity is HP and the operating system is Linux, the output could be a first probability that the function is printer and a second probability that the function is a server, e.g., [0.7, 0.3]. The probabilities may be based on the vendor, operating system, function, and one or more property values.

Embodiments are able to overcome the situation where an entity is unclassified with respect to one or more classification attributes being unknown or absent while at least classification attribute is present or available. This may be overcome by effectively utilizing one or more of the available classification attributes with one or more property values to determine one or more of the (previously) unknown classification attributes. For example, the operating system classification attribute of an entity may be Windows™ while the function and vendor are not known. Embodiments may use one or more properties values associated with the entity and the operating system classification attribute of Windows™ to determine that the entity is a Windows™ Surface Tablet (e.g., based a vendor property value being Microsoft™). Embodiments may thus effectively combine information determined from classification rules or ML models for classification (e.g., of function and OS) with one or more property values to further enhance coverage of unknown classification attributes.

As another example, if the function classification of an entity is smartphone (e.g., based on one or more DHCP properties, one or more hypertext transfer protocol (HTTP) headers, one or more domain name system (DNS) communications, hostname, etc.), while the operating system and vendor may be unknown, embodiments may use a user agent (property value) comprising Samsung™ to determine that the operating system of the entity is the Android™ OS. Embodiments are thus able to overcome an entity classification attribute being unknown by using any output of a classification process (e.g., one or more classification attributes) in conjunction with one or more property values to determine a classification or an improved classification.

Embodiments are able to determine more classification attributes or classification while leveraging available property values associated with an entity. For example, if the vendor associated with an entity is Samsung and the function classification attribute is smartphone, then the previously unknown operating system can be determined to be Android (e.g., based on a meta classification rule or model). Embodiments may thus be able to increase overall classification coverage without new properties (and associated values) or new modules for collecting additional information to be used for classification.

Embodiments may determine one or more classifications (e.g., including one or more classification attributes) using local resources, cloud resources, or a combination thereof. In some embodiments, various stages of classification (e.g., Nth stage classifier 320, N+1th stage classifier 322) may be performed by different entities (e.g., different network monitor entities, e.g., network monitor device 102 and network monitor device 280). In various embodiments, later stages of classification may be based on additional information (e.g., from a cloud resource). The use of various stages of classification in a distributed manner may allow using information for classification that is not available to each of the entities performing classification. For example, one network monitor entity (e.g., network monitor device 102 or 280) may have access to network traffic of a particular segment of an enterprise network which may be used to determine one or more properties associated with an entity that are otherwise not available to other network monitoring entities.

The results of the various stages of classification may be combined to determine a classification result (e.g., enhanced classification result 324). In some embodiments, the results of various stages of classification may be combined by an entity managing multiple entities (e.g., network monitor device 102, network monitor device 280). The classification performed by embodiments may thus be performed in a distributed manner.

Accordingly, described herein in various implementations are systems, methods, techniques, and related technologies, which may perform classification. As described herein, various techniques can be used to perform classification using one or more classification attributes in combination with one or more property values associated with an entity to achieve improved classification. Embodiments are able to improve classification coverage and accuracy and thereby the user experience.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, other network devices, etc., may be used to enforce segmentation on a network (and different address subnets may be used for each segment). Enforcement points may enforce segmentation by filtering or dropping packets according to the network segmentation policies/rules. The viability of a network segmentation project depends on the quality of visibility the organization has into its devices and the amount of work or labor involved in configuring network devices.

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users.

Depending on the entity, an entity may have an IP address (e.g., a device) or may be without an IP address (e.g., a serverless service). Embodiments are able to dynamically (e.g., on the fly or responsive to changing conditions, for instance, an entity being communicatively coupled to a network or in response to determination of characteristics of an entity) control access of various entities or micro-segment various entities, as described herein.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122a-b. Network device 104 may be one or more network switches, access points, routers, firewalls, hubs, etc.

Network monitor device 102 may be operable for a variety of tasks including determining one or more properties, one or more classifications, security actions, as described herein. Network monitor device 102 can perform the classification using one or more properties associated with an entity to determine one or more classification attributes (e.g., a first classification result). The one or more classification attributes may be determined based on rules, profiles, fingerprints, models, etc.

The one or more classification attributes may then be used along with the one or more properties associated with the entity to determine one or more additional classification attributes (e.g., a second classification result). The one or more additional classification attributes may be based on a correlation of one or more classification attributes (e.g., of the first classification result) and one or more one or more properties associated with the entity. The additional classification attributes may be determine using one more correlation or meta rules or a correlation or meta model (e.g., ML model) trained based on one or more correlations. A confidence value may be determined with each of the classification attributes. The confidence value may be compared with a threshold (e.g., confidence threshold, granularity threshold, improvement threshold, etc.) to determine whether the classification should be used (e.g., for performing an action, security policy, etc.) or additional classifications should be performed. In some embodiments, network monitor device 102 can use local resources (e.g., a local model or local data store), cloud resources (e.g., a model or a data store), or a combination thereof for performing the classification.

Network monitor device 102 can determine one or more enforcement points where the entity is communicatively coupled to the network and thereby determine the one or more enforcement points closest to the entity. For example, network monitor device 102 may access information on a switch (e.g., a switch cache) to determine a port (e.g., physical port, wireless port, or virtual port) where an entity with a particular IP address or MAC address or other identifier is communicatively coupled. Network monitor device 102 may also access information from a wireless access point where the entity is communicatively coupled. In some embodiments, network monitor device 102 may poll information from a cloud service to determine where an entity is communicatively coupled or connected to a network. In various embodiments, network monitor device 102 access syslog or SNMP information from an entity itself to determine where an entity is communicatively coupled or connected to a network (e.g., without accessing information from a network entity or enforcement point). Network monitor device 102 supports applying access policies in situations where an entity is communicatively coupled to a network with more than one connection (e.g., a wired connection and a wireless connection).

Based on the enforcement point, network monitor device 102 determines the one or more access rules to be assigned to the one or more enforcement points based on an access policy. In some embodiments, based on information about the one or more enforcement points closest to the entity, network monitor device 102 translates the access policy into one or more commands that will be used to configure the access rules on the one or more enforcement points. The closest enforcement point to an entity can be enforcement point where the entity is communicatively coupled. The enforcement point may be network device or network infrastructure device closest in proximity (e.g., physical proximity) to the entity. The enforcement point comprises the port where the entity is communitive coupled to the network, and communication to and from the entity is sent first through that port. In some embodiments, the port of the enforcement point is the last point of communication within network infrastructure before communication is sent to the entity. In various embodiments, the closest enforcement point is where communication from the entity is initially sent when communications are sent from the entity (e.g., prior to communications with the network backbone or Internet backbone). For example, the closest enforcement point to an entity connected to a switch is the switch. As another example, the closest enforcement point to an entity wirelessly communicatively coupled to a wireless access point is wireless access point. In various embodiments, network monitor device 102 may access the current configuration of the one or more enforcement points to determine the access rules (e.g., ACLs) that are to be applied to the one or more enforcement points, as described herein. In some embodiments, an entity is communicatively coupled to a wireless controller via a wireless access point and the wireless controller or a switch is the closest enforcement point (e.g., based on the wireless controller or the switch being able to apply access rules, for instance ACLs, to communications of the entity, for instance, in the case where the wireless access point is not able to or does not have the functionality to apply access rules). In various embodiments, an entity is communicatively coupled to a layer 3 switch via a layer 2 switch and the layer 3 switch is the closest enforcement point (e.g., based on the layer 3 switch being able to apply access rules, for instance ACLs, to communications of the entity, for instance, in the case where the layer 2 switch is not able to or does not have the functionality to apply access rules).

Network monitor device 102 may then apply or assign the access rules to the one or more enforcement points closest to the entity. Network monitor device 102 may communicate the access rules via application programming interfaces (APIs), command line interface (CLI) commands, Web interface, simple network management protocol (SNMP) interface, etc. In some embodiments, network monitor device 102 may verify that the one or more enforcement points have been properly or correctly configured based on the access rules.

Network monitor device 102 may provide an interface (e.g., a graphical user interface (GUI)) for viewing, monitoring, and modifying classification or associated thresholds associated one or more models, as described herein. Network monitor device 102 may further monitor network traffic over time to reclassify entities as new entities join the network, entities rejoin the network, and new models are made available.

Network monitor device 102 may further perform a variety of operations including identification, classification, and taking one or more remediation actions (e.g., changing network access of an entity, changing the virtual local area network (VLAN), sending an email, sending a short message service (SMS) message, etc.).

An enforcement point may be a router, firewall, switch, hypervisor, software-defined networking (SDN) controller, virtual firewall, or other network device or infrastructure that may have an ACL like or rule like policy or functionality to apply based on the port where an entity is communicatively coupled thereto. Enforcements points may also be a next generation firewall (NGFW) and cloud infrastructure. A NGFW can be updated with an ACL like policy regarding an entity accessing the Internet. Cloud infrastructure (e.g., amazon web services (AWS) security groups) can be updated to drop packets from the IP of the entity that have a destination outside the cloud. Embodiments are operable to configure enforcement points at the edge of a network where an entity is communicatively coupled thereto thereby controlling access of the entity on a customized basis (e.g., customized or tailored for the entity).

In some embodiments, if the categorization or characteristics functionality is being updated (e.g., which could result in a change in one or more access rules that are assigned to an enforcement point closest an entity and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After conformation, the access rules may be changed.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor device 102 may be based on a combination of one or more pieces of information including traffic analysis, information from external or remote systems (e.g., system 150), communication (e.g., querying) with an aggregation device (e.g., aggregation device 106), and querying the entity itself (e.g., via an API, CLI, web interface, SNMP, etc.), which are described further herein. Network monitor device 102 may be operable to use one or more APIs to communicate with aggregation device 106, device 120, device 130, or system 150. Network monitor device 102 may monitor for or scan for entities that are communicatively coupled to a network via a NAT device (e.g., firewall, router, etc.) dynamically, periodically, or a combination thereof.

Information from one or more external or 3$^{rd}$ party systems (e.g., system 150) may further be used for determining one or more tags or characteristics for an entity. For example, a vulnerability assessment (VA) system may be queried to verify or check if an entity is in compliance and provide that information to network monitor device 102. External or 3$^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor device 102 may be able to receive information from agent 140, installation or execution of agent 140 on many entities may not be possible, e.g., IoT or smart devices.

System 150 may be one or more external, remote, or third party systems (e.g., separate) from network monitor device 102 and may have information about devices 120 and 130 and network coupled devices 122a-b. System 150 may include a vulnerability assessment (VA) system, a threat detection (TD) system, endpoint management system, a mobile device management (MDM) system, a firewall (FW) system, a switch system, an access point system, etc. Network monitor device 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to a device being monitored by network monitor device 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network devices (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor device 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122*a-b* and provide network access to network coupled devices 122*a-b*. Aggregation device 106 may further be configured to provide information (e.g., operating system, entity software information, entity software versions, entity names, application present, running, or both, vulnerabilities, patch level, etc.) to network monitor device 102 about the network coupled devices 122*a-b*. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), WiFi™ HaLow, HomePlug, Multimedia over Coax Alliance (MoCA), and Ethernet. For example, aggregation device 106 may be coupled to the network device 104 via an Ethernet connection and coupled to network coupled devices 122*a-b* via a wireless connection. Aggregation device 106 may be configured to communicate with network coupled devices 122*a-b* using a standard protocol with proprietary extensions or modifications.

Aggregation device 106 may further provide log information of activity and properties of network coupled devices 122*a-b* to network monitor device 102. It is appreciated that log information may be particularly reliable for stable network environments (e.g., where the types of devices on the network do not change often). The log information may include information of updates of software of network coupled devices 122*a-b*.

Figure 2:
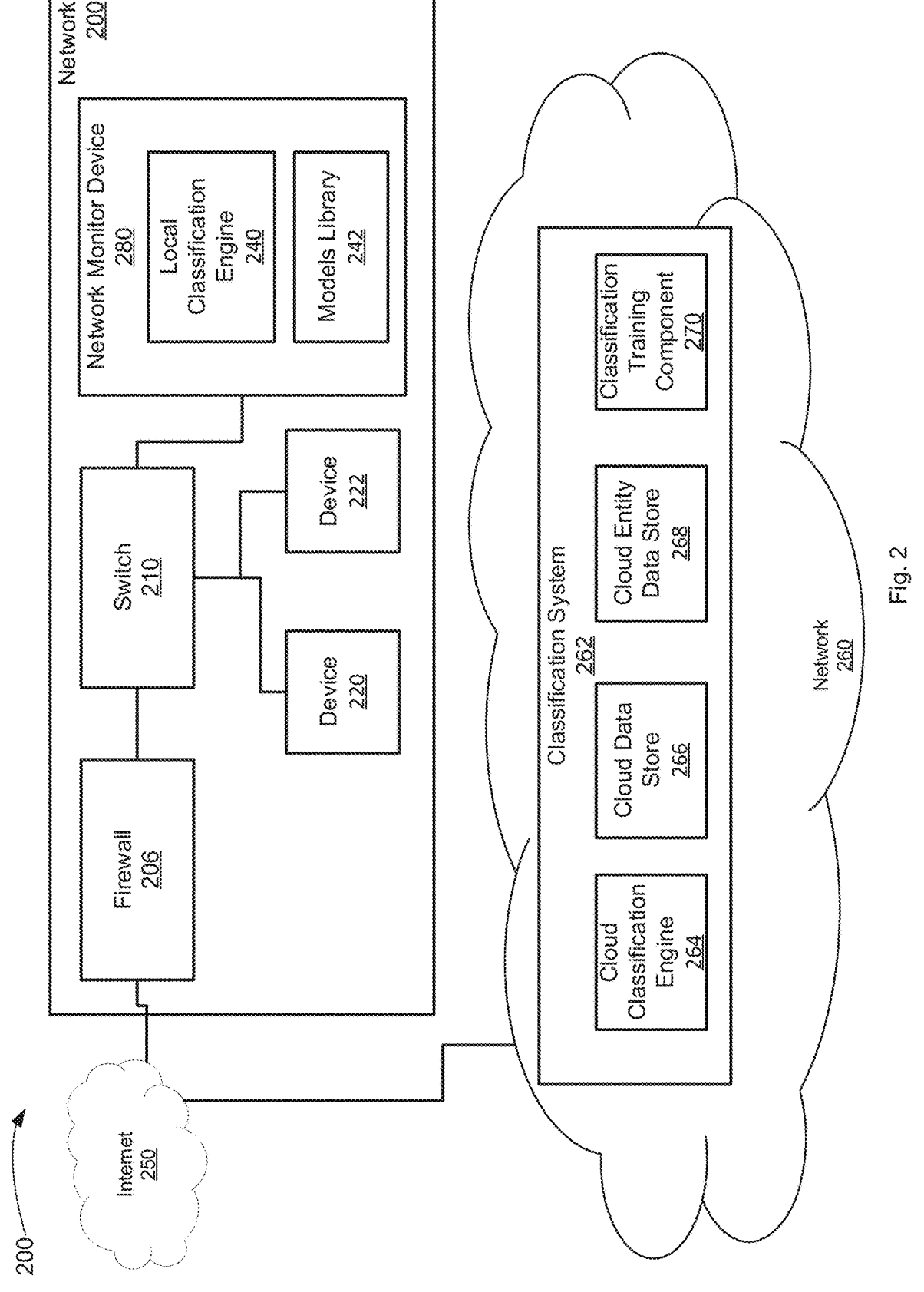
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewall 206 and switch 210) and a network monitor device 280 (e.g., network monitor device 102) which can perform or determine one or more classifications, as described herein, associated with the various entities communicatively coupled in example network 200. Network monitor device 280 may further perform training of one or more models for use in classification, as described herein. Example components are shown of network monitor device 280 and classification system 262 and other components may be present or included.

FIG. 2 shows example devices 220-222 (e.g., devices 106, 122*a-b*, 120, and 130, other physical or virtual devices, other entities, etc.) and it is appreciated that more or fewer network devices or other entities may be used in place of the devices of FIG. 2. Example devices 220-222 may be any of a variety of devices or entities (e.g., OT devices, IoT devices, IT devices, etc.), as described herein. Enforcement points including firewall 206 and switch 210 may be any entity (e.g., network device 104, cloud infrastructure, etc.) that is operable to allow traffic to pass, drop packets, restrict traffic, etc. Network monitor device 280 may be any of a variety of network devices or entities, e.g., router, firewall, an access point, network access control (NAC) device, intrusion prevention system (IPS), intrusion detection system (IDS), deception device, cloud-based device or entity, virtual machine based system, etc. Network monitor device

280 may be substantially similar to network monitor device 102. Embodiments support IPv4, IPv6, and other addressing schemes. In some embodiments, network monitor device 280 may be communicatively coupled with firewall 206 and switch 210 through additional individual connections (e.g., to receive or monitor network traffic through firewall 206 and switch 210).

Switch 210 communicatively couples the various devices of network 200 including firewall 206, network monitor device 280, and devices 220-222. Firewall 206 may perform network address translation (NAT). Firewall 206 communicatively couples network 200 to Internet 250 and firewall 206 may restrict or allow access to Internet 250 based on particular rules or ACLs configured on firewall 206. Firewall 206 and switch 210 are enforcement points, as described herein.

Network monitor device 280 can access network traffic from network 200 (e.g., via port mirroring or SPAN ports of firewall 206 and switch 210 or other methods). Network monitor device 280 can perform passive scanning of network traffic by observing and accessing portions of packets from the network traffic of network 200. Network monitor device 280 may perform an active scan of an entity of network 200 by sending one or more requests to the entity of network 200. The information from passive and active scans of entities of network 200 can be used to determine one or more properties associated with the entities of network 200.

Network monitor device 280 includes local classification engine 240 which may perform classification of the entities of network 200 including firewall 206, switch 210, and devices 220-222, as described herein. Network monitor device 280 further includes data store 242 which includes one or more correlation classification or meta classification resources (e.g., meta rules or meta models for determining a classification or one or more classification attributes based on one or more classification attributes and one or more property values). Models of data store 242 may have been trained locally (e.g., by network monitor device 280), in the cloud (e.g., by classification system 262), or a combination thereof, based on the correlations or meta rules described herein.

The meta classification resources may be associated with confidence values associated with each classification attribute or classification result and further associated confidence thresholds. In some embodiments, the thresholds may be customized based on user input, configured in association with training, or a combination thereof. Local classification engine 240 may perform classification (e.g., blocks of flow-chart 400) of the entities of network 200, using one or more classification resources of data store 242, based on one or more classification attributes and one or more property values associated with an entity.

Classification system 262 may be a cloud classification system operable to perform one or more classifications, as described herein. In some embodiments, classification system 262 may be part of a larger system operable to perform a variety of functions, e.g., part of a cloud based network monitor entity, a security entity, etc.

Local classification engine 240 can send data (e.g., properties, property values and one or more classification attributes) about entities of network 200, as determined by local classification engine 240, to classification system 262. Local classification engine 240 may encode and encrypt the data prior to sending the data to classification system 262. In some embodiments, local classification engine 240 checks the confidence, granularity, improvement, or combination thereof of each classification result or attribute and communicates with classification system 262 data to perform a classification where a confidence granularity, improvement, or other threshold has not been met. Local classification engine 240 may receive a classification result (e.g., including one or more classification attributes) from classification system 262 which network monitor device 280 can use to perform various security related measures. In some embodiments, classification of an entity may be performed in part by local network monitor device 280 (e.g., local classification engine 240) and in part by classification system 262.

Classification system 262 may include cloud classification engine 264, cloud data store 266, cloud entity data store 268, and classification training component 270. Cloud classification engine 264 may perform classification (e.g., blocks of flowchart 400) based on data received from network monitor device 280 (e.g., one or more property values and one or more classification attributes), as described herein. Cloud classification engine 264 may unencrypt and decode the information received prior to performing a classification. Cloud classification engine 264 may use cloud data store 266 in determining a classification based on one or more property values and one or more classification attributes. A classification determined by cloud classification engine 264 can be sent back to network monitor device 280. In some embodiments, a classification determined by cloud classification engine 264 may be sent back to network monitor device 280 based on the classification meeting or exceeding a confidence granularity, improvement, or other threshold.

Cloud data store 266 may be a data store (e.g., a cloud database) including correlation classification or meta classification resources (e.g., for classifying based on one or more classification attributes and one or more property values using one or more meta rules or meta models), as described herein. Cloud classification engine 264 and cloud data store 266 may not be subject to the resource conditions or limitations (e.g., processing power, storage, etc.) that may impact network monitor device 280 (e.g., and local classification engine 240). Cloud data store 266 may further include rules, profiles, fingerprints, models, and other resource that may be used for classification.

In various embodiments, cloud data store 266 may include a data store (e.g., database) of classification attributes, correlations of classification attributes, and properties values which may be used to classify an entity based on property values of the entity and one or more classification attributes matching one or more classification attributes and one or more property values properties values within the data store. The classification associated with the matched property values and one or more classification attributes may be output by cloud classification engine 260.

Cloud entity data store 268 is a data store (e.g., a cloud entity database) of entity information that has been uploaded to classification system 262. The entity information may include properties, property values, classification attributes, etc., from multiple networks. For example, the data in cloud entity data store 268 may include entity or device name, operating system, function, vendor/model, and host information from a variety of networks (e.g., that have network monitor entities configured to upload entity information, other properties, and property values).

Classification training component 270 is configured to train one or more meta models or determine meta classification rules based on classifications (e.g., labels), classification attributes, one or more properties, and correlations thereof, as described herein. The data of cloud entity data store 268 may be used by classification training component 270 to train one or more meta models. Cloud entity data store 268 may be used to train one or more of the classification resources of cloud data store 266. Model training component 270 may further evaluate models and determine respective confidence, granularity, improvement, and other thresholds and parameters associated with each classification resource, as described herein. Embodiments may support meta classification resources being determined or trained locally (e.g., by network monitor device 280).

Both local classification engine 240 and cloud classification engine 264 may use profile based classification, fingerprint based classification, along with other classification methods in conjunction with classifications based on correlations of one or more classification attributes and one or more properties, as described herein.

Figure 3:
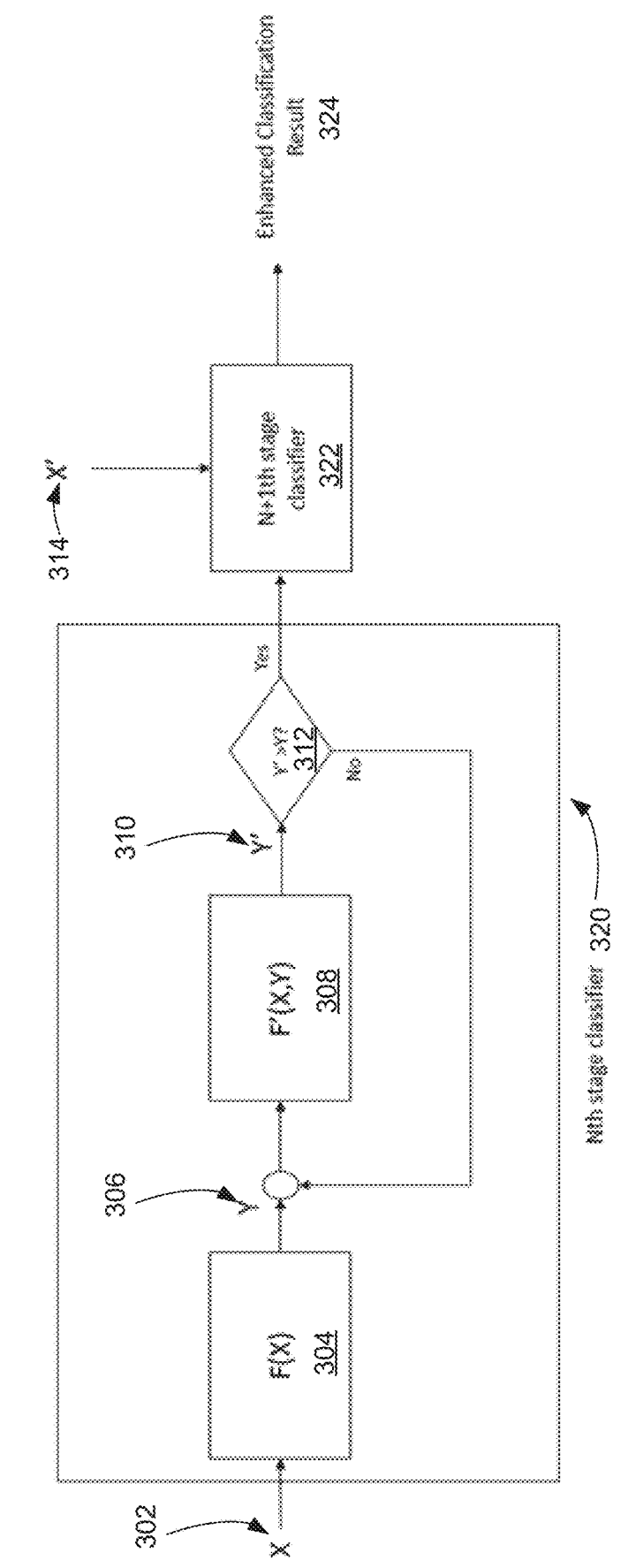
FIG. 3 depicts a diagram of aspects of classification including one or more stages in accordance with one implementation of the present disclosure.

FIG. 3 depicts a diagram of aspects of classification including one or more stages in accordance with one implementation of the present disclosure. FIG. 3 depicts an example diagram 300 of information and various stages of a classification process, in accordance with one implementation of the present disclosure. Various portions of diagram 300 may be performed by different components (e.g., components of system 500) of an entity (e.g., network monitor device 102 or network monitor device 280). Various portions of diagram 300 may be performed as part of flowchart 400. The process of diagram 300 may be extendable to a N-tier classification system where the input to the Nth stage is the output of the N−1th stage.

Nth stage classifier 320 accesses or receives data 302 (X). Data 302 may include one or more property values (e.g., accessed or determined from network traffic or other sources of information) associated with an entity of a plurality of entities. The property values may be determined as described herein. Data 302 may be selected or refined, as described herein, by a network monitor (e.g., network monitor device 102 or 280). Data 302 may include one or more properties and property values associated with a selected entity (e.g., selected based on being communicatively coupled to the network, selected as part of a scan or classification scan of a network, for instance, periodically or upon an update of a classification resource or classification information).

In some embodiments, data 302 may be a vector of attributes or property values. The property values may be accessed from network traffic, one or more cloud resources, another system (e.g., system 150), etc.

Function F(X) 304 is operable to determine a classification result or one or more classification attributes (associated with an entity) based on the data 302. The classification attributes may be determined based on one or more property values associated with an entity. The one or more classification attributes may be determined using one or more of fingerprint matching, profile matching, one or more rules, a model (e.g., a machine learning model), or a combination thereof. The one or more classification attributes may include one or more of function, OS, or vendor.

Function F(X) 304 may output the one or more classification attributes as data 306 (Y). In some embodiments, data 306 may include a table or vector of probabilities associated with one or more classification attributes. For example, the vector may be <5, 4, 0>, where the first position in the vector represents a function of an entity and the value 5 represents the function being a smartphone. The second position of the vector may represent the operating system and the value of 4 may represent the Android operating system. The third position may represent the vendor and the value of 0 may represent that the vendor being unknown.

In some embodiments, data 306 may include one or more confidence or probability values associated with one or more classification attributes. The one or more confidence or probability values may be based on one or more rules, profiles, fingerprints, or models used to determine the classification attributes of data 306. In some embodiments, data 306 may include or further include a vector with probabilities or confidences associated with one or more classification attributes. For example, the vector of probabilities or confidences may be <0.6, 0.9, 0> where the first position of the vector may represent the probability or confidence of a function classification attribute of entity. The value of 0.6 may represent a 60% confidence in the function classification attribute. The second position of the vector may represent the probability or confidence of an OS classification attribute of entity. The value of 0.9 may represent a 90% confidence in the operating system classification attribute. The third position of the vector may represent the probability or confidence of an OS classification attribute of entity. The value of 0 may represent that the vendor is unknown. The vector of probabilities (and the various positions of the vector) may be associated with the above classification attributes vector.

Data 306 may be accessed by function F'(X,Y) 308 and used to determine data 310 including a classification results (e.g., a second or additional classification result comprising one or more classification attributes). Function F'(X,Y) 308 may use one or more meta rules or a meta model, or a combination thereof, to determine a classification result based on one or more classification attributes (e.g., vendor, function, operating system), one or more property values, for a combination thereof to determine a classification result. The classification result may be output as data 310 (Y'). In some embodiments, data 310 may include one or more vectors which include confidence values or probabilities and one or more vectors representing a classification result (including one or more classification attributes) in numeric form. This may be in a substantially similar in format or structure to the vector of data 306.

Function 312 (Y'>Y) may be configured to determine whether the classification from function F'(X,Y) 308, represented by data 306, is improved or better than the classification from function F(X) 304, represented by the data 310. The classification from function F'(X,Y) 308 may be determined to be better than the classification of function F(X) 304 based on the classification from function F'(X,Y) 308 having one or more additional classification attributes or other information as compared to the classification of function F(X) 304. For example, the classification from function F'(X,Y) 308 may have the classification attribute of operating system as iOS™ while the classification of function F(X) 304 has a vendor classification attribute of Apple™ and a function classification attribute of smartphone. Having one or more additional pieces of classification information may be considered as having increased or improved granularity. Embodiments may thus improve on previous classifications.

Embodiments may further improve classifications with improved, more detailed, or finer granularity for one or more classification attributes. For example, a function classification attribute could be improved by going from networking to router.

A classification of data 310 may be further considered better based on the classification represented by data 310 being a finer or higher granularity, having an associated higher confidence, having an associated confidence higher than a threshold, etc. For example, if the confidence of a classification result (of data 310) is above a threshold, then it may be considered better than the classification determined by function F(X) 306 (e.g., which was lower or below a threshold).

The classification from function F'(X,Y) 308 may be considered better than the classification determined by function F(X) 306, if the classification includes a classification for a new or previously unknown classification attribute. For example, if the classification represented by data 306 included classification attributes for a vendor and an operating system and the classification represented by data 310 included a classification attribute for function (which previously was not determined or unknown), the classification from function F'(X,Y) 308 may be considered better than the classification from function F(X) 306.

If the classification from function F'(X, Y) 308, represented by data 306, is better than the classification of function F(X) 304, represented by the data 310, then N+1 stage classifier 322 may be performed. If the classification from function F'(X,Y) 308, represented by data 306, is not better than the classification of function F(X) 304, represented by the data 310, or above a threshold (e.g., a confidence, granularity, or improvement threshold) then function F'(X, Y) 308 may be performed again. When function F'(X, Y) 308 is performed again, function F'(X, Y) 308 may take the data 310 as input (e.g., in combination with data 306 and one or more property values).

In some embodiments, N+1 stage classifier 322 may be optional (e.g., based on the classification of data 310 meeting one or more criteria, for instance, a confidence threshold, granularity level, etc.). N+1 stage classifier 322 may be configured to perform a classification based on the data 310 (Y') and data 314 (X'). N+1 stage classifier 322 may have substantially similar functionality to Nth stage classifier 320. In some embodiments, N+1 stage classifier 322 may include its own instances of function F(X) 304, function F'(X,Y) 308, and function 312 (Y'>Y).

Data 314 (X') may include one or more property values that were not present in data 302 (X). For example, data 302 (X) may include data for a local network and data 314 may include data associated with an entity from a cloud or other network, information gathered from the Internet (e.g., based on an Internet search query including one or more properties associated with the entity, for instance, in data 302), information (e.g., including one or more properties) from an external system (e.g., system 150). Data 314 could also have properties values determined using passive scans, active scans, or properties that are associated with increased resource usage (e.g., time, processing resources, etc.). For example, data 314 could include data from running a script (e.g., WMI script) on an entity which may takes more processing resources, time, or a combination thereof, as compared to a passive property value (e.g., determined from network traffic).

In various embodiments, N+1 stage classifier 322 may be performed when new or additional data or information (e.g., one or more property values), including in data 314, becomes available or in response to new data or information becoming available about an entity. For example, as an entity communicates more on the network additional property values may become available to be used as data 314. Additional property values may also become available from other portions of a network (e.g., network infrastructure, other systems, for instance, system 150, etc.) which may be accessible or provide information to a network monitor entity (e.g., network monitor device 102 or 280, for instance through an integration model).

Data 314 may be used to determine a first classification result including one or more classification attributes using a substantially similar function F(X) 304 of an entity. The one or more classification attributes of the first classification result and data 314 may be used by a substantially similarly instance of F(X) 308 to determine a second classification result. The second classification result may be determined using one or more meta rules or one or more meta models, as described herein.

The first classification result may then be compared to second classification using a substantially similar instance of function 312 (Y'>Y). If the second classification result is determined to be better than first classification result (e.g., based on having additional classification attributes, higher granularity, etc.), the second classification result may be output as classification result 324. If the second classification result is determined to not be better than the first classification result (e.g., based on having additional classification attributes, higher granularity, etc.), the second classification result may be used to determine another classification result by the instance of function F'(X,Y) 308 using the second classification result, data 314, the first classification, or combination thereof. The another classification result may then be compared using an instance of function 312 (Y'>Y). If the another classification result is determined to be better than previous classification (e.g., based on having additional classification attributes, higher granularity, etc.), the another classification result may be output as classification result 324. Classification result 324 may be stored, used for one or more policies, used to perform one or more action, or a combination thereof. In some embodiments, the first classification result may be output as classification result 324 if above a threshold (e.g., confidence, granularity, etc.).

In some embodiments, Nth stage classifier 320 may classify an entity based on passive or lightweight properties and N+1th stage classifier 322 may further classify an entity based on active properties, more resource intensive properties (e.g., in terms of time, processing power, etc.), or other properties.

In various embodiments, Nth stage classifier 320 may determine one or more classifications using local resources (e.g., local computing resources, for instance of a network monitoring entity) and N+1th stage classifier 322 may determine one or more classifications using remote resources (e.g., cloud computing resources, for instance of a cloud based network monitoring entity).

In some embodiments, one or more classifications determined by various portions of diagram 300 may be output when a level of sufficient precision, fine granularity, confidence, improvement, or a combination thereof is achieved. For example, if an entity is classified as with a function of PCL by manufacturer A, serial #12345, and an operating system of Linux that meets or exceeds threshold confidence levels, the classification process may be output or reported as the classification result.

In some embodiments, functions or portions of diagram 300 may function or be as described in Table I.

TABLE I

| Example descriptions of variables, functions, or expressions of diagram 300. | |
| --- | --- |
| Variable, Function, or Expression | Example Description |
| X | Raw attribute vector |
| Y | Classification output vector from F(X) [function, OS, vendor] |
| X' | Raw attributes not in X |
| Y' | Enhanced classification output from stage N |
| F(X) | Initial classification function, e.g. rule/ML based on raw features. |
| F'(X,Y) | 'Meta' rule/ML based classifier |
| Y'>Y | Is Y' an improved classification vector compared to Y? |

Figure 4:
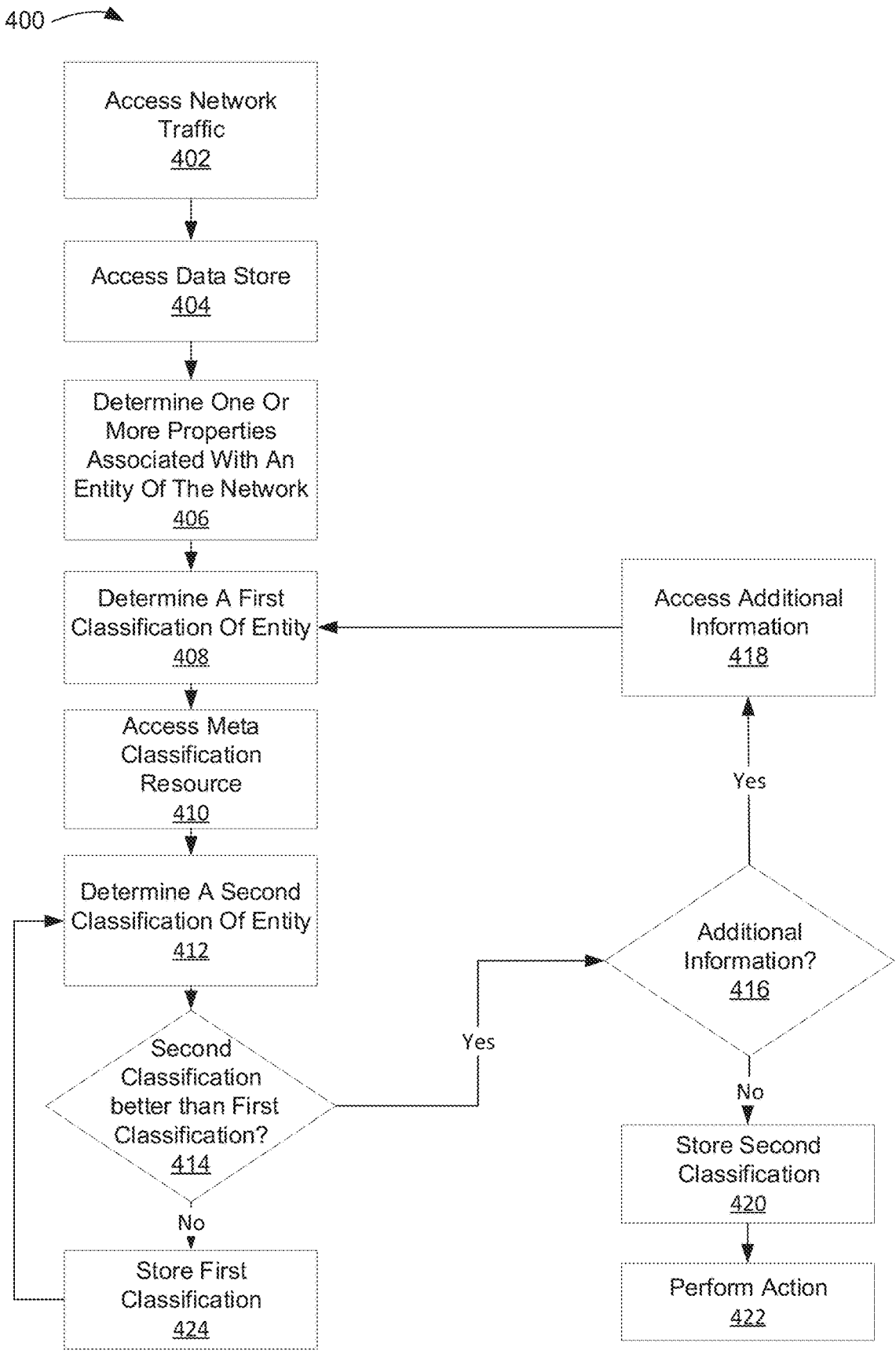
FIG. 4 depicts a flow diagram of aspects of a method for classification in accordance with one implementation of the present disclosure.

With reference to FIG. 4, flowchart 400 illustrates example operations used by various embodiments. Although specific operation blocks ("blocks") are disclosed in flowchart 400, such blocks are examples. That is, embodiments are well suited to performing various other blocks or variations of the blocks recited in flowchart 400. It is appreciated that the blocks in flowchart 400 may be performed in an order different than presented, and that not all of the blocks in flowchart 400 may be performed. The blocks of flowchart 400 may be performed locally by an entity, in a cloud, or a combination thereof.

FIG. 4 depicts a flow diagram of aspects of a method for classification in accordance with one implementation of the present disclosure. Various portions of flowchart 400 may be performed by different components (e.g., components of system 500) of an entity (e.g., network monitor device 102 or network monitor device 280). Flowchart 400 depicts a process for determining an improved classification. Various blocks of flowchart 400 may be performed to carry out various portions, functions, or operations described with respect to FIG. 3.

At block 402, network traffic is accessed. The traffic may be accessed by a network monitoring entity (e.g., network monitoring devices 102 or 280) via a port mirroring or SPAN port or via another method, as described herein. The traffic data may include one or more properties and property values for each entity communicatively coupled to one or more networks. The one or more properties and property values may be extracted from the traffic data. The traffic may include active scanning properties (e.g., if active scanning is enabled).

In some embodiments, data (e.g., including properties and property values) is further accessed from third party systems (e.g., system 150, an external system, etc.) and used along with traffic data. The data from third party systems may be accessed from the third party systems via a plugin or module of a network monitoring entity. For example, this data could be accessed from a variety of systems including, but not limited to, a vulnerability assessment (VA) system, a threat detection (TD) system, endpoint management system, a mobile device management (MDM) system, a firewall (FW) system, a switch system, an access point system, a WMI script, network infrastructure, an entity itself, etc.

In some embodiments, the network traffic is accessed based on an entity being selected or being communicatively coupled to a network. The entity may be selected as part of a periodic scan of the network (e.g., a scan of network 100 by network monitoring device 102). The entity may further be selected as part of a continuous, real-time, or combination thereof scan of the network. The entity may be an endpoint, a user, etc., as described herein. An entity being communicatively coupled to the network may be detected (e.g., being communicatively coupled to network device 104 or other enforcement point). The detecting of the entity coupled to the network may include detecting the entity in response to the entity being recoupled or readmitted to the network. This may further include detecting that a user has logged into a machine or the active user account on a device has changed.

At block 404, a data store is (optionally) accessed. The data store may be a local or cloud resource (e.g., cloud entity data store 268) with information of various entities (e.g., properties and associated property values). The data store may include entity data (e.g., properties and property values) from one or more network monitoring entities (e.g., network monitor devices 102 and 280) that have been uploaded data. The data store may be organized or configured for use in training or classifying entities. The data store may be part of an external system (e.g., system 150) and include information associated with an entity. The data store may also include information determined based on the performing an Internet search using one or more properties values associated with one or more entities.

At block 406, one or more properties associated with an entity of the network are determined. The one or more properties may be determined in a variety of ways. The properties can include data or values determined by extracting data or values (e.g., a portion of a field of a packet, one or more fields of a packet, etc.) from network traffic (e.g., packets) associated with each entity. For example, one or more properties and property values may be determined by accessing or selecting the properties values based on one or more keywords or variables associated with one or more portions of a packet, protocol fields, information from Nmap, information from p0f, data from active scans (e.g., probing or sending requests to an entity), etc. Each property may be stored as a property key (e.g., property name) and value (e.g., data of the property) pair. The properties may include network interface card (NIC) vendor (e.g., portion of a MAC address), dynamic host control protocol (DHCP) vendor class, HTTP user agent string, operating system (OS) data, network function, transmission control protocol/internet protocol (TCP/IP) Syn Ack fingerprint, virtual machine guest OS, Nmap-Banner, Windows™ version, DHCP hostname, Macintosh Manageable, DHCP device class, Linux Manageable, open ports, DHCP options list, DHCP request list, DHCP device OS, MAC Address, Macintosh OS Version, DNS Name, Linux OS version, Switch Port power over Ethernet (PoE) connected device, system description, classified by action or operator classified, device is a NAT device, Windows™ services installed, and switch port name. The properties associated with an entity may be represented as key (e.g., property or property name) value sets where each property is associated with one or more associated values (e.g., a value from a portion of a packet). The properties can thus be accessed from one or more packets being transmitted over the network agentlessly or without involvement of an agent (e.g., software for collecting the properties running on the entity sending the packets). In yet other embodiments, properties may be determined in other ways.

The properties may further include identification information (e.g., serial number, etc.), device categorization, user categorization, location, compliance, risk, or a combination thereof which may be based on fingerprints, signatures, entity behavior, etc., as described herein. Embodiments are able to determine the one or more properties, or other aspects of an entity agentlessly (e.g., based on observing network traffic without needing software running on the entity to access the properties) thereby allowing properties or other aspects of an entity to be quickly determined for entities that do not have or support an agent as well as without needing an agent to be installed for entities that do support an agent. In some embodiments, the one or more properties or other aspects are determined in real-time (e.g., instantaneously or substantially instantaneously). For example, a compliance characteristic may be determined based on an antivirus scan that is specified in a network access policy.

Properties may be collected or accessed from various of sources including, from the entity, from the network environment, network devices or enforcement points (e.g., one or more switches, routers, firewalls, etc.) and any other entity or resource communicatively coupled to the network (e.g., network 100) including other systems (e.g., system 150). The properties may be determined by an entity (e.g., network monitor device 102 or network monitor device 280) that is configured to perform one or more blocks of flowchart 400.

At block 408, a first classification of the entity is determined. The classification of the entity may be determined using a model (e.g., ML model) based classification, profile based classification, rules based classification, fingerprint based classification, etc., or a combination thereof. The entity may be classified based on the properties and property values associated with the entity (e.g., based on network traffic, a data store, etc., as described herein). If the entity cannot be classified (e.g., with a confidence above a threshold), the classification result will be unclassified. The first classification may include one or more classification attributes including vendor, function, operating system. The first classification may be output as a vector, a matrix, or other data structure including one or more classification attributes in numerical form, one or more probabilities or confidences scores associated with each classification attribute, as described herein.

In some embodiments, if the first classification is not determined (e.g., as unknown) or the entity is classified (e.g., the classification result is unknown) as unclassified, block 402 may be performed.

At block 410, a meta classification resource is accessed. The meta classification resource may be accessed from a data store (e.g., local data storage resource, for instance memory, a hard drive, a database, a cloud resource, etc.). In some embodiments, the meta classification resource may be loaded into memory or another resource to be used for classification. The meta classification resource may be a data store with one or more meta rules or a meta ML model (or other artificial intelligence model or structure), as described herein. The meta classification resource may include functionality or other capabilities (e.g., rules, one or more models, etc.) to determine to a classification based on one or more correlations of one or more classification attributes, one or more property values, or a combination thereof. The correlations associated with the meta classification resource may be determined using ML, artificial intelligence, or other functionality (e.g., pattern recognition functionality). The meta classification resource may be used to classify an entity using or based on one or more classification attributes of a first classification (e.g., block 408) and one or more properties associated with the entity (e.g., block 406).

At block 412, a second (or additional) classification of the entity is determined. The second classification of the entity may be determined based on one or more classification attributes of a first classification (e.g., block 408), one or more property values (e.g., block 406), or a combination thereof. For example, if a function classification attribute of the first classification is smartphone and a user agent property associated with the entity includes AppleWebkit, the meta classification resource may classify the operating system of the entity as iOS™ as part of the second classification. As another example, if a function (classification attribute) of an entity is classified as networking and the vendor (classification attribute) of the entity is Juniper Networks, the second classification of the entity may include the operating system as being Junos OS.

In some embodiments, the output of the meta classification resource may have an associated confidence or probability (e.g., expressed as a percentage), as described herein. The confidence may be associated with the strength of the correlation used to determine the second classification. For example, if the second classification is the operating system associated with the entity is Windows™ the confidence may be 95%.

At block 414, whether the second classification is better than the first classification is determined. The second classification may be determined to be better than the first classification in a variety of ways. The second classification may be determined to be better than the first classification based on the second classification having an additional classification attribute as compared to the first classification, as described herein. For example, if the second classification includes an operating system classification attribute of iOS™ that was not part of the first classification, the second classification may be determined to be better than the first classification.

The second classification may be determined to be better than the first classification if the second classification has a higher or finer granularity than the first classification, as described herein. For example, if the first classification has a function classification of networking, the second classification may have a higher granularity based on having a function classification of networking-switch or wireless access point. As another example, if the first classification has an OS classification of Windows™, the second classification may have a higher granularity based on having an OS classification of Windows 10 (including the OS version).

If the second classification is determined to be better than the first classification, block 416 may be performed. If the second classification is determined to not be better than the first classification, block 424 may be performed.

At block 416, whether additional information (e.g., data 314) is available is determined. The determination of whether additional information is available may be determined based on checking a data store having information associated with the entity for new information (e.g., information different from previous information, new information within a given time period, for instance, since the most recent classification, information from another system, for instance, system 150, etc.). The additional information may include new data or information associated with an entity. The additional information may include one or more property values (e.g., a property value that involves increased time, processing resources, or a combination thereof), information from another system, information using active scanning or probing, etc. The additional information may include one or more classification attributes, one or more property values that were not used for the first or second classifications (e.g., blocks 408 and 412). If additional information is available, block 418 may be performed. If additional information is not available, block 420 may be performed.

At block 418, the additional information is accessed. The additional information may be accessed from another system (e.g., system 150), a cloud resource, another system performing classification (e.g., network monitor 102, network monitor 280, etc.). In some embodiments, if the second classification is not better than the first classification (after use of additional information by blocks 408, 412, or a combination) as determined in block 414, block 416 may be performed.

At block 420, the second classification is stored. The second classification may be stored for use in security procedures, asset inventory, segmentation, etc. In some embodiments, the second classification may be stored locally, remotely (e.g., in a cloud resource), or a combination thereof.

At block 422, an action is performed. The action may be based on the classification of an entity and be a security based action or other business related action, as described herein.

At block 424, the first classification is stored. The first classification may be stored for use in security procedures, asset inventory, segmentation, etc. In some embodiments, the first classification may be sorted locally, remotely (e.g., in a cloud resource), or a combination thereof. In some embodiments, block 412 may then be performed. In various embodiments, block 422 may be performed based on the first classification.

Figure 5:
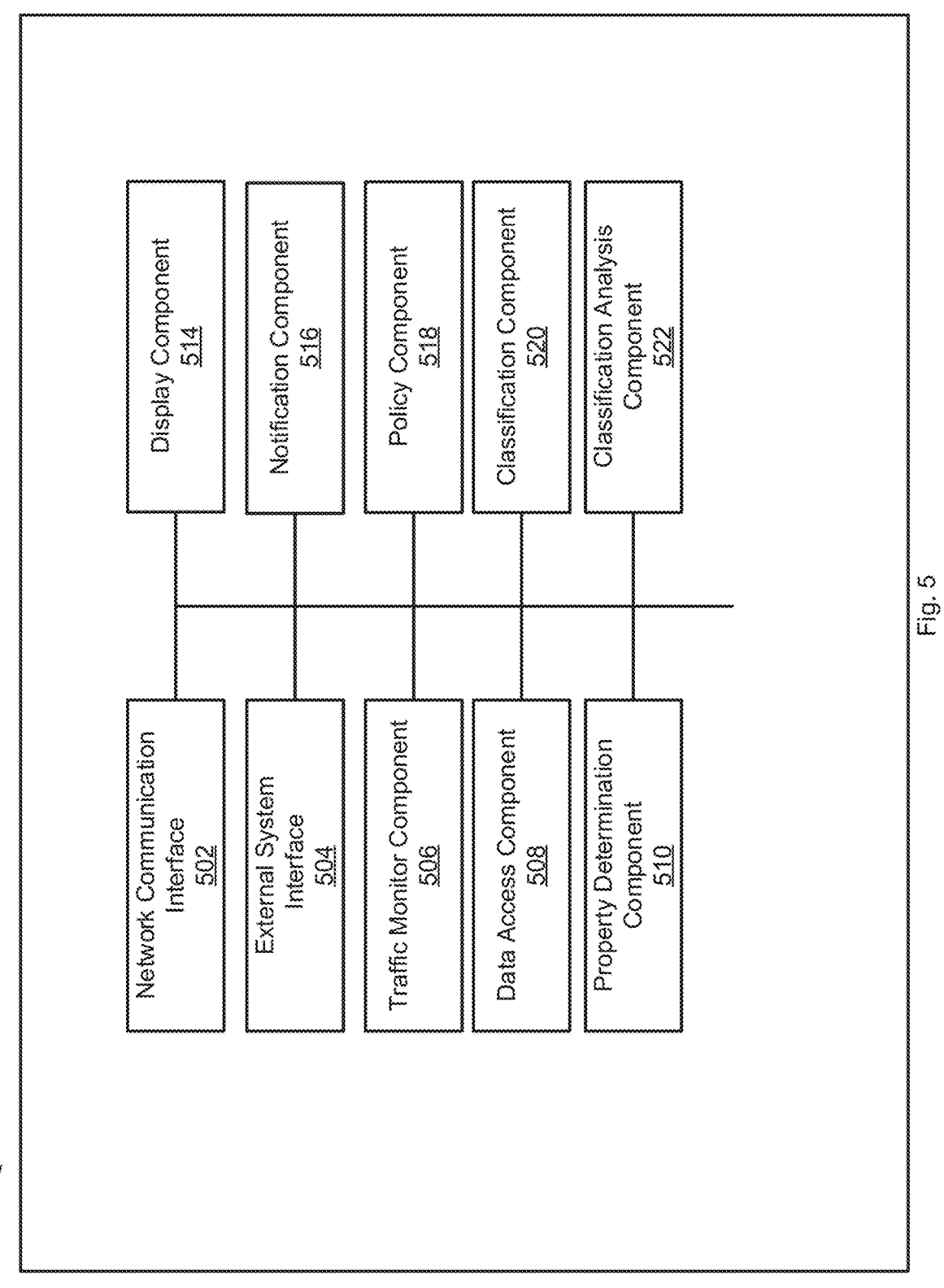
FIG. 5 depicts illustrative components of a system for classification in accordance with one implementation of the present disclosure.

FIG. 5 illustrates example components used by various embodiments. Although specific components are disclosed in system 500, it should be appreciated that such components are examples. That is, embodiments are well suited to having various other components or variations of the components recited in system 500. It is appreciated that the components in system 500 may operate with other components than those presented, and that not all of the components of system 500 may be required to achieve the goals of system 500.

FIG. 5 depicts illustrative components of a system for classification in accordance with one implementation of the present disclosure. Example system 500 or classifier 500 includes a network communication interface 502, an external system interface 504, a traffic monitor component 506, a data access component 508, a property determination component 510, a display component 514, a notification component 516, a policy component 518, a classification component 520, and a classification analysis component 522. The components of system 500 may be part of a computing system or other electronic device (e.g., network monitor device 102 or network monitor device 280) or a virtual machine or device and be operable to monitor and one or more entities communicatively coupled to a network, monitor network traffic, determine one or more classifications of an entity, perform one or more actions, as described herein. For example, the system 500 may further include a memory and a processing device, operatively coupled to the memory, which may perform the operations of or execute the components of system 500. The components of system 500 may access various data and characteristics or properties associated with an entity (e.g., network communication information) and data associated with one or more entities. It is appreciated that the modular nature of system 500 may allow the components to be independent and allow flexibility to enable or disable individual components or to extend, upgrade, or combination thereof components without affecting other components thereby providing scalability and extensibility. System 500 may perform one or more blocks of flow diagram 400. In some embodiments, the components of 500 may be part of network monitor entity (e.g., network monitor devices 102 and 280), in the cloud, or the various components may be distributed between local, cloud resources, or other resources.

Communication interface 502 is operable to communicate with one or more entities (e.g., network device 104, firewall 206, switch 210, other devices coupled thereto, devices 220-222, etc.) coupled to a network that are coupled to system 500 and receive or access information about entities (e.g., device information, device communications, device characteristics, properties, etc.), access information as part of a passive scan, send one or more requests as part of an active scan, receive active scan results or responses (e.g., responses to requests), as described herein. The communication interface 502 may be operable to work with one or more components to initiate access to characteristics or determination of characteristics of an entity to allow determination of one or more properties which may then be used for device compliance, asset management, standards compliance, classification, identification, etc., as described herein. Communication interface 502 may be used to receive and store network traffic for determining properties, as described herein.

External system interface 504 is operable to communicate with one or more third party, remote, or external systems to access information including characteristics or properties about an entity (e.g., to be used to determine a security aspects). External system interface 504 may further store the accessed information in a data store. For example, external system interface 504 may access information from a vulnerability assessment (VA) system to enable determination of one or more compliance or risk characteristics associated with the entity. External system interface 504 may be operable to communicate with a vulnerability assessment (VA) system, an advanced threat detection (ATD) system, a mobile device management (MDM) system, a firewall (FW) system, a switch system, an access point (AP) system, etc. External system interface 504 may query a third party system using an API or CLI. For example, external system interface 504 may query a firewall or a switch for information (e.g., network session information) about an entity or for a list of entities that are communicatively coupled to the firewall or switch and communications associated therewith. In some embodiments, external system interface 504 may query a switch, a firewall, or other system for information of communications associated with an entity.

Traffic monitor component 506 is operable to monitor network traffic to determine if a new entity has joined the network or an entity has rejoined the network and monitor traffic for analysis by data access component 508, classification component 520, and classification analysis component 522, as described herein. Traffic monitor component 506 may have a packet engine operable to access packets of network traffic (e.g., passively) and analyze the network traffic. The traffic monitor component 506 may further be able to access and analyze traffic logs from one or more entities (e.g., network device 104, system 150, or aggregation device 106) or from an entity being monitored. The traffic monitor component 506 may further be able to access traffic analysis data associated with an entity being monitored, e.g., where the traffic analysis is performed by a third party system.

Data access component 508 may be operable for accessing data including metadata associated with one or more network monitoring entities (e.g., network monitor devices

102 or 280-282), including properties that the network monitoring entity is monitoring or collecting, software versions (e.g., of the profile library of the network monitoring entity), and the internal configuration of the network monitoring entity. The data accessed by data access component 508 may be used by embodiments to perform classification including ensuring that the most up to date models, rules, fingerprints, profiles, and other classification information is being used (e.g., by classification component 520). Data access component 508 may further access vertical or environment data and other user associated data, including vertical, environment, common type of devices for the network or network portions, segments, areas with classification issues, etc., which may be used for classification.

Data access component 508 may access data associated with active or passive traffic analysis or scans or a combination thereof. Data access component may further be able to access and analyze traffic logs from one or more entities (e.g., network device 104, system 150, or aggregation device 106) or from an entity being monitored. Data access component 508 may further be able to access traffic analysis data associated with an entity being monitored, e.g., where the traffic analysis is performed by a third party system. Information accessed by data access component 508 may be stored, displayed, and used as a basis for classification (e.g., blocks of flowchart 400), model training, model evaluation, etc., as described herein.

In some embodiments, data access component 508 may access additional information beyond network traffic, as described herein. The additional information may include one or more property values (e.g., a property value that involves increased time, CPU or processing resources, or a combination thereof), information from another system, information using active scanning or probing, information not previously available, etc. The additional information may include one or more classification attributes, one or more property values that were not used for previous classifications (e.g., a first or second classification, for a N+1th stage classifier). The additional information may be accessed from another system (e.g., system 150), a cloud resource, another system performing classification (e.g., network monitor 102, network monitor 280, etc.).

Property determination component 510 is configured to determine one or more properties associated with an entity, as described herein. Property determination component 510 may determine one or more properties and associated values associated with an entity based on analysis (e.g., including extraction of properties and values) of network traffic, as described herein. The properties can then be stored and used by other components (e.g., classification component 520, classification analysis component 522, etc.) for performing one or more classifications (e.g., based on profile, rules, fingerprints, models, meta classifications resources, etc.), as described herein.

Classification component 520 is configured to determine one or more classifications or classification results, e.g., comprising one or more classification attributes, which may be used to further classify an entity based on the one or more classification attributes and one or more property values associated with the entity, as described herein. A first classification result, comprising one or more classification attributes, may be determined based on one or more rules, profile libraries, entity or device fingerprints, models, etc. A second classification result, comprising one or more classification attributes, may be determined based one or more classification attributes of the first classification and one or more properties associated with the entity, as described herein.

The second classification result may be determined based on meta rules or meta models which are based on correlations of classification attributes and one or more property values, as described herein.

The one or more classification results may be determined using featurized data based on the results of one or more classification attributes and one or more property values associated with the entity (e.g., using one or more meta rules or one or more meta models, for instance, meta ML models). Classification component 520 is further configured to determine a confidence associated with a classification (result), as described herein, which may then be compared with a confidence threshold, as described herein.

In some embodiments, classification component 520 may use local resources (e.g., local classification engine 240), cloud resources (e.g., classification system 262), or a combination thereof for determining one or more classification results.

Classification analysis component 522 is configured to compare multiple classification results (e.g., classification attributes) to determine if a second classification result is better than a first classification result (e.g., substantially similar to function 312). A second classification result may be determined to be better than a first classification result based on the second classification result having one or more additional (or new) classification attributes or information as compared to the first classification result. A second classification may also be considered better based on the first classification result by having a finer or higher granularity, having an associated higher confidence, having an associated confidence higher than a threshold, etc.

Display component 514 is configured to optionally display one or more graphical user interfaces or other interfaces (e.g., command line interface) for depicting various information associated with entities, classification, thresholds (e.g., confidence, granularity, or other thresholds), and models, as described herein. In some embodiments, display component 514 may display or render a network graph of entities including one or more classifications, access rules associated with entities, and other access rule information (e.g., access policies, access templates, etc.).

Notification component 516 is operable to initiate one or more notifications based on the results of one or more classifications and other analysis of communications, as described herein. The notification may be any of a variety of notifications, e.g., IT ticket, email, SMS, a HTTP notification, etc., as described herein.

Policy component 518 is operable for initiating or triggering one or more remediation actions or security actions according to one or more policies, e.g., based on one or more classifications, as described herein. Policy component 518 may further be configured to perform other operations including checking compliance status, finding open ports, etc. In some embodiments, policy component 518 may verify that an assignment of one or more access rules to one or more enforcements points has been properly assigned or configured. Policy component 518 may restrict network access, signal a patch system or service, signal an update system or service, etc., as described herein. The policy component 518 may thus, among other things, invoke automatically (e.g., without user or human interaction) patching, automatically updating, and automatically restrict network access of an entity (e.g., that has out-of-date software or based on access rule violation or attempted violation).

The actions may include restricting network access to a particular level (e.g., full, limited, or no network access, for instance via an enforcement point), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

The system 500 may be software stored on a non-transitory computer readable medium having instructions encoded thereon that, when executed by a processing device, cause the processing device to access network traffic from a network. The network traffic may be associated with a plurality of entities. The instructions may further cause the processing device determine one or more values associated with one or more properties associated with the entity. The one or more values may be based on the network traffic. The instructions may further cause the processing device to determine a first classification attribute based on the one or more values associated with one or more properties associated with the entity. The instructions may further cause the processing device to determine a second classification attribute based on the first classification attribute and the one or more values associated with one or more properties associated with the entity. The instructions may further cause the processing device to store the second classification attribute.

In some embodiments, the instructions may further cause the processing device to perform an action based on the second classification attribute. In various embodiments, a first classification result comprises the first classification attribute and a second classification result comprises the second classification attribute, and wherein the second classification result is not present in the first classification result. In some embodiments, the second classification attribute has a higher granularity than the first classification attribute. In various embodiments, the second classification attribute is different from the first classification attribute. In some embodiments, the first classification attribute is at least one of a vendor, a function, or an operating system (OS). In various embodiments, the second classification attribute is at least one of a vendor, a function, or an operating system (OS). In some embodiments, the second classification attribute is further based on additional information not present in the one or more values associated with one or more properties associated with the entity. In various embodiments, the second classification attribute is based on at least one of a rule or a machine learning (ML) model.

Figure 6:
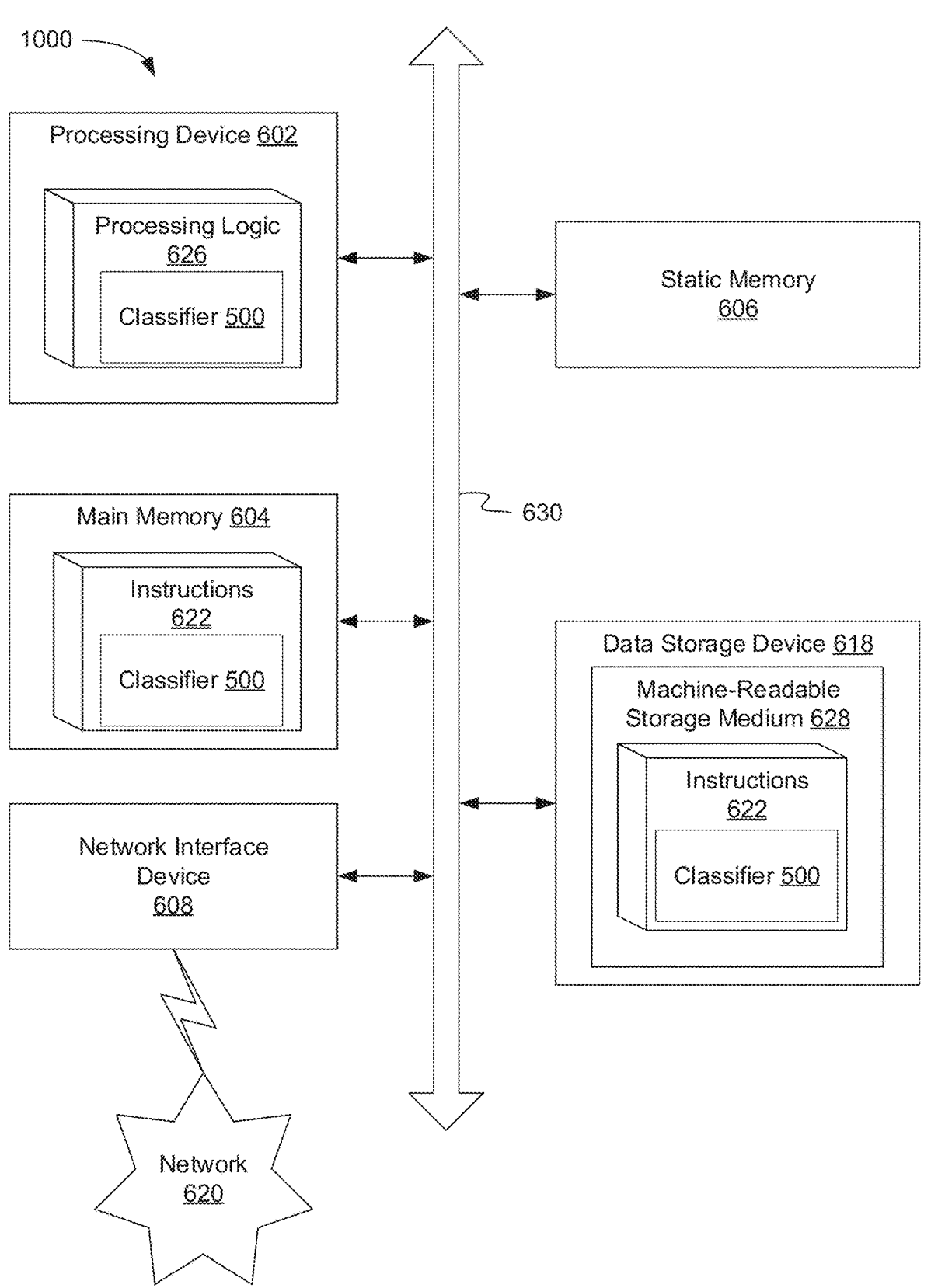
FIG. 6 is a block diagram illustrating an example computer system, in accordance with one implementation of the present disclosure.

FIG. 6 is a block diagram illustrating an example computer system, in accordance with one implementation of the present disclosure. FIG. 6 illustrates a diagrammatic representation of a machine in the example form of a computer system 6 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 10 may be representative of a server, such as network monitor device 102 running classifier 500 to perform classification, as described herein.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of classifier 500 shown in FIG. 5, for performing the operations and steps discussed herein.

The data storage device 618 may include a machine-readable storage medium 628, on which is stored one or more set of instructions 622 (e.g., software) embodying any one or more of the methodologies of functions described herein, including instructions to cause the processing device 602 to execute classifier 500. The instructions 622 may also reside, completely or at least partially, within the main memory 604 and/or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for determining one or more classifications (e.g., including one or more classification attributes), as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:

accessing network traffic via an enforcement point communicatively coupled to an entity of a network;

determining, based on the network traffic, one or more values associated with one or more properties associated with the entity;

determining, at a first classifier stage, a first classification attribute based on the one or more values using a first classification model, wherein the first classification attribute comprises a first output vector comprising a first entity classification result and a first confidence score associated with the first entity classification result;

determining, by a processing device and at the first classifier stage, a second classification attribute based on the first classification attribute and the one or more values using the first output vector and the one or more properties associated with the entity as input for a second classification model, wherein the second classification attribute comprises a second output vector comprising a second entity classification result different from the first entity classification result and a second confidence score associated with the second entity classification result, wherein the second classification attribute has a higher granularity than the first classification attribute, and the second confidence score of the second output vector is greater than the first confidence score of the first output vector, and wherein the second classification model determines the second classification attribute based on a correlation between the second classification attribute and the first classification attribute determined by applying one or more correlation rules to the first classification attribute and the one or more properties associated with the entity, the correlation rules to determine a new classification from a prior classification without collection of additional entity properties;

determining, at a second classifier stage and based on the second classification attribute, an enhanced classification output, wherein the first classifier stage and the second classifier stage are arranged in a distributed manner, one of the first classifier stage and the second classifier stage uses a local classification resource, and the other one of the first classifier stage and the second classifier stage uses a cloud classification resource.

2. The method of claim 1, wherein a first classification result comprises the first classification attribute and a second classification result comprises the second classification attribute, and wherein the second classification result is not present in the first classification result.

3. The method of claim 1, wherein the second classification attribute is different from the first classification attribute.

4. The method of claim 1, wherein the first classification attribute is at least one of a vendor, a function, or an operating system (OS).

5. The method of claim 1, wherein the second classification attribute is at least one of a vendor, a function, or an operating system (OS).

6. The method of claim 1, wherein the second classification attribute is further based on additional information not present in the one or more values associated with one or more properties associated with the entity.

7. The method of claim 1, wherein the second classification attribute is based on at least one of a rule or a machine learning (ML) model.

8. A system comprising:

a memory; and a processing device, operatively coupled to the memory, to:

access network traffic via an enforcement point communicatively coupled to an entity of a network;

determine, based on the network traffic, one or more values associated with one or more properties associated with the entity;

determine, at a first classifier stage, a first classification attribute based on the one or more values using a first classification model, wherein the first classification attribute comprises a first output vector comprising a first entity classification result and a first confidence score associated with the first entity classification result;

determine, by a processing device and at the first classifier stage, a second classification attribute based on the first classification attribute and the one or more values using the first output vector and the one or more properties associated with the entity as input for a second classification model, wherein the second classification attribute comprises a second output vector comprising a second entity classification result different from the first entity classification result and a second confidence score associated with the second entity classification result, wherein the second classification attribute has a higher granularity than the first classification attribute, and the second confidence score of the second output vector is greater than the first confidence score of the first output vector, and wherein the second classification model determines the second classification attribute based on a correlation between the second classification attribute and the first classification attribute determined by applying one or more correlation rules to the first classification attribute and the one or more properties associated with the entity, the correlation rules to determine a new classification directly from a prior classification without collection of additional entity properties;

determine, at a second classifier stage and based on the second classification attribute, an enhanced classification output, wherein the first classifier stage and the second classifier stage are arranged in a distributed manner, one of the first classifier stage and the second classifier stage uses a local classification resource, and the other one of the first classifier stage and the second classifier stage uses a cloud classification resource.

9. The system of claim 8, wherein a first classification result comprises the first classification attribute and a second classification result comprises the second classification attribute, and wherein the second classification result is not present in the first classification result.

10. The system of claim 8, wherein the second classification attribute is different from the first classification attribute.

11. The system of claim 8, wherein the second classification attribute is further based on additional information not present in the one or more values associated with one or more properties associated with the entity.

12. The system of claim 8, wherein the second classification attribute is based on at least one of a rule or a machine learning (ML) model.

13. A non-transitory computer readable medium having instructions encoded thereon that, when executed by a processing device, cause the processing device to:

access network traffic via an enforcement point communicatively coupled to an entity of a network;

determine, based on the network traffic, one or more values associated with one or more properties associated with the entity;

determine, at a first classifier stage, a first classification attribute based on the one or more values using a first classification model, wherein the first classification attribute comprises a first output vector comprising a first entity classification result and a first confidence score associated with the first entity classification result;

determine, by the processing device and at the first classifier stage, a second classification attribute based on the first classification attribute and the one or more values using the first output vector and the one or more properties associated with the entity as input for a second classification model, wherein the second classification attribute comprises a second output vector comprising a second entity classification result different from the first entity classification result and a second confidence score associated with the second entity classification result, wherein the second classification attribute has a higher granularity than the first classification attribute, and the second confidence score of the second output vector is greater than the first confidence score of the first output vector and wherein the second classification model determines the second classification attribute based on a correlation between the second classification attribute and the first classification attribute determined by applying one or more correlation rules to the first classification attribute and the one or more properties associated with the entity, the correlation rules to determine a new classification directly from a prior classification without collection of additional entity properties;

determine, at a second classifier stage and based on the second classification attribute, an enhanced classification output, wherein the first classifier stage and the second classifier stage are arranged in a distributed manner, one of the first classifier stage and the second classifier stage uses a local classification resource, and the other one of the first classifier stage and the second classifier stage uses a cloud classification resource.

14. The non-transitory computer readable medium of claim 13, wherein a first classification result comprises the first classification attribute and a second classification result comprises the second classification attribute, and wherein the second classification result is not present in the first classification result.

* * * * *